(12) United States Patent
Nouri et al.

(10) Patent No.: US 11,676,357 B2
(45) Date of Patent: Jun. 13, 2023

(54) MODIFICATION OF PROJECTED STRUCTURED LIGHT BASED ON IDENTIFIED POINTS WITHIN CAPTURED IMAGE

(71) Applicant: Hewlett-Packard Development Company, L.P., Spring, TX (US)

(72) Inventors: Joseph Nouri, Fort Collins, CO (US); Robert Paul Martin, Fort Collins, CO (US); Mark Lessman, Fort Collins, CO (US); Tsung-Nung Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/415,000

(22) PCT Filed: Jul. 26, 2019

(86) PCT No.: PCT/US2019/043701
§ 371 (c)(1),
(2) Date: Jun. 17, 2021

(87) PCT Pub. No.: WO2021/021085
PCT Pub. Date: Feb. 4, 2021

(65) Prior Publication Data
US 2022/0189131 A1 Jun. 16, 2022

(51) Int. Cl.
*G06V 10/145* (2022.01)
*G06V 40/16* (2022.01)
*H04N 23/56* (2023.01)

(52) U.S. Cl.
CPC ........ *G06V 10/145* (2022.01); *G06V 40/166* (2022.01); *G06V 40/174* (2022.01); *H04N 23/56* (2023.01)

(58) Field of Classification Search
None
See application file for complete search history.

(56) References Cited

U.S. PATENT DOCUMENTS

| | | | |
|---|---|---|---|
| 10,248,842 B1 | 4/2019 | Bardagjy et al. | |
| 10,295,827 B1 | 5/2019 | Chao et al. | |
| 10,863,146 B1 * | 12/2020 | Siminoff | H04N 7/186 |
| 10,901,092 B1 * | 1/2021 | Kantor | G01S 17/89 |
| 10,928,190 B2 * | 2/2021 | Taubin | G06F 17/17 |
| 11,069,082 B1 * | 7/2021 | Ebrahimi Afrouzi | G06T 7/521 |
| 11,153,503 B1 * | 10/2021 | Ebrahimi Afrouzi | H04N 23/51 |

(Continued)

OTHER PUBLICATIONS

"Piccirilli, Marco & Doretto, Gianfranco & Ross, Arun & Adjeroh, Donald. (2015). "A Mobile Structured Light System for 3D Face Acquisition". IEEE Sensors Journal. 16. 1-1. 10.1109/JSEN.2015. 2511064. Apr. 1, 2016".

*Primary Examiner* — Reza Aghevli
(74) *Attorney, Agent, or Firm* — Quarles & Brady LLP

(57) ABSTRACT

Structured light is projected onto an object, and an image of the object as illuminated by the projected structured light is captured. Reference object points are identified within the captured image, and the structured light projected onto the object is modified based on the identified reference object points. An additional image of the object as illuminated by the modified projected structured light is captured, and additional reference object points are identified within the captured additional image.

13 Claims, 8 Drawing Sheets

(56) References Cited

U.S. PATENT DOCUMENTS

| | | |
|---|---|---|
| 2004/0010778 A1 | 1/2004 | Kaler et al. |
| 2012/0062719 A1 | 3/2012 | Debevec et al. |
| 2015/0332459 A1 | 11/2015 | Znamenskiy et al. |
| 2016/0360954 A1* | 12/2016 | Rohling .................. G06T 7/521 |
| 2017/0048494 A1* | 2/2017 | Boyle .................... G01C 11/02 |
| 2017/0091535 A1 | 3/2017 | Yu et al. |
| 2017/0286788 A1 | 10/2017 | Fan et al. |
| 2018/0096196 A1 | 4/2018 | Gordon |
| 2018/0165862 A1 | 6/2018 | Sawaki |
| 2019/0029528 A1 | 1/2019 | Tzvieli et al. |
| 2019/0066316 A1 | 2/2019 | Bardagjy et al. |
| 2019/0355138 A1* | 11/2019 | Hall ........................ G06T 7/97 |
| 2020/0293750 A1* | 9/2020 | Zu ......................... H04N 23/56 |
| 2021/0181597 A1* | 6/2021 | Moon ................... G03B 11/045 |
| 2022/0030153 A1* | 1/2022 | Joo ....................... G01S 7/4816 |
| 2022/0083775 A1* | 3/2022 | Chu ..................... G06V 10/141 |
| 2022/0236052 A1* | 7/2022 | Park ................... G01B 11/2513 |

* cited by examiner

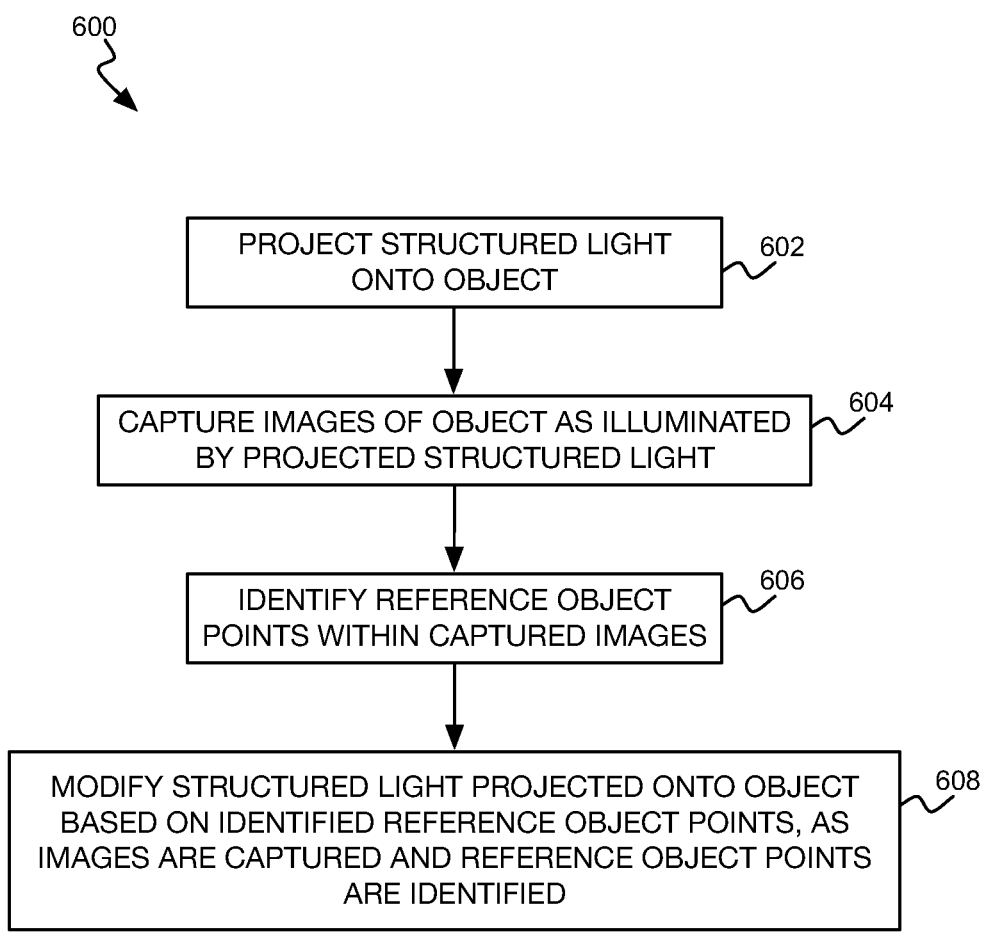

MODIFICATION OF PROJECTED STRUCTURED LIGHT BASED ON IDENTIFIED POINTS WITHIN CAPTURED IMAGE

BACKGROUND

Extended reality (XR) technologies include virtual reality (VR), augmented reality (AR), and mixed reality (MR) technologies, and quite literally extend the reality that users experience. XR technologies may employ head-mounted displays (HMDs), for instance. An HMD is a display device worn on the head or as part of a helmet. In VR technologies, the HMD wearer is immersed in an entirely virtual world, whereas in AR technologies, the HMD wearer's direct or indirect view of the physical, real-world environment is augmented. In MR, or hybrid reality, technologies, the HMD wearer experiences the merging of real and virtual worlds.

BRIEF DESCRIPTION OF THE DRAWINGS

FIG. 6 is a diagram of an example non-transitory computer-readable data storage medium.

DETAILED DESCRIPTION

Figure 1:
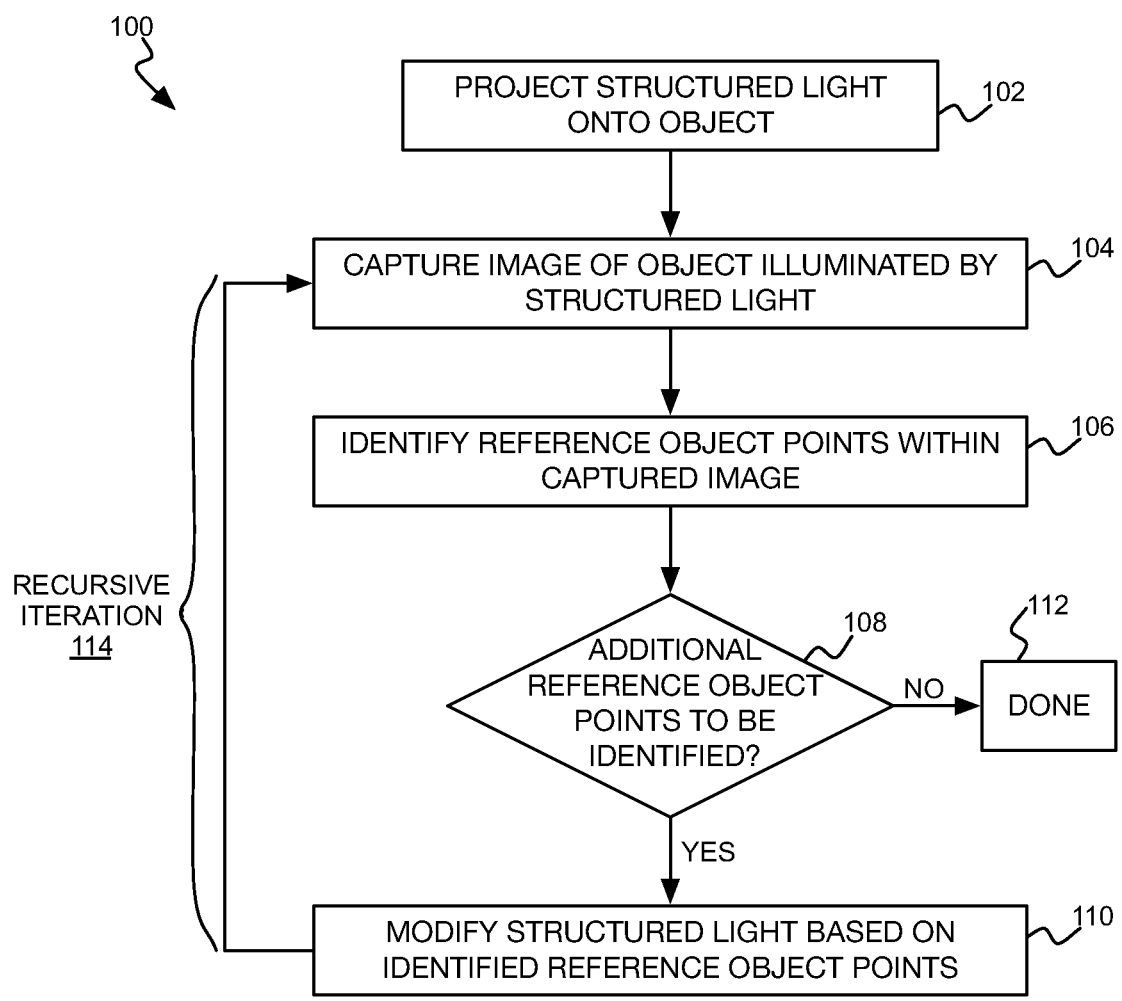
FIG. 1 is a flowchart of an example method for identifying reference object points within captured images of an object illuminated by projected structured light by modifying the structured light in a recursively iterative manner.

As noted in the background, a head-mounted display (HMD) can be employed as an extended reality (XR) technology to extend the reality experienced by the HMD's wearer. An HMD can include a small display in front of one or each eye of the wearer, as well as various sensors to detect or sense the wearer so that the images projected on the HMD's display convincingly immerse the wearer within an XR, be it a virtual reality (VR), augmented reality (AR), a mixed reality (MR), or another type of XR. Examples of such sensors can include global positioning system (GPS) or other geolocation sensors to determine the geographic location of the wearer, as well as accelerometers, gyroscopes, compasses and other such sensors to detect motion and orientation of the wearer.

An HMD can further effectively include as a sensor a camera, which is an image-capturing device that captures still or motion images. For example, the camera of an HMD may be employed to capture images of the wearer's lower face, including the mouth, so that the wearer's facial expressions and correspondingly derived information, like facial cues and emotions, of the wearer can be assessed. Detecting facial features of the wearer of an HMD provides for even fuller immersion within an XR, so that the XR suitably responds to the wearer's facial expressions, facial cues, and emotions, and so that any graphical representation of the wearer within the XR, such as an avatar, changes in correspondence with changes in the wearer's actual facial expressions.

Machine learning models can be trained to detect facial features of HMD wearers from captured images, by specifically identifying reference points corresponding to facial landmarks of the wearer's facial features. For example, a machine learning model may identify the center point of the bottom of an HMD wearer's upper lip and the center point of the top of the wearer's lower lip. From this information, whether the wearer of the HMD has his or her mouth open or closed can be assessed. As another example, a machine learning model may identify the corners of the wearer's mouth, and from this information in comparison to the center points of the wearer's lips assess whether the user is smiling or frowning.

Acquiring training data to train such machine learning models has proven to be difficult, however. A large variety of different users may be asked to wear HMDs and make various facial expressions (such as in accordance with a provided script) while images of the users are recorded. For the resulting captured images to serve as machine learning model training data, the images have to be annotated to identify the reference points corresponding to the desired landmarks of the wearers' facial features, on which model training occurs.

Manual annotation, in which developers or other personnel review the captured images and manually identify the reference points, is cumbersome, time-consuming, and expensive, particularly since a large amount of such training data is usually needed for machine learning model accuracy. Furthermore, after-the-fact image analysis, in which captured images are subsequently subjected to various image processing and pattern recognition techniques to identify the reference points in an automated manner, has proven to be inadequate in accurately identifying the reference points. To the extent that the reference points are inaccurately identified within the captured images, the resultantly trained machine learning model will have less than stellar accuracy.

Techniques described herein ameliorate such issues associated with acquiring machine learning model training data in which reference points of interest are identified within captured images. While an object, such as an HMD wearer, is illuminated by projected structured light, the techniques recursively capture images of the object, identify the reference points within the captured images, and modify the structured light projected onto the object based on the identified reference points. At each recursive iteration, the techniques modify the structured light to improve identification of additional reference points from images of the object as illuminated by the modified structured light that are captured in the next iteration.

FIG. 1 shows an example method 100 for identifying reference object points within captured images of an object illuminated by projected structured light, by modifying the structured light in a recursively iterative manner. The object may be a human, such as a human face or a portion thereof (e.g., the lower facial region of a person, including his or her mouth). The method 100 may be performed by a processor executing program code stored on a non-transitory computer-readable data storage medium.

The method 100 includes projecting structured light onto the object (102). Structured light is light of a known spatial pattern or shape that is projected onto an object to permit determination of surface, depth, and/or other information regarding the object. Examples of structured light include a grid of intersecting horizontal and vertical lines, a sequence of parallel (e.g., horizontal or vertical) lines, and a single line. Other examples include one or more circles, ovals, squares, other rectangles, triangles, and other shapes. When there is more than one such shape, the shapes may be organized within a grid.

The method 100 includes capturing an image of the object as illuminated by the projected structured light (104), and identifying referencing object points within the captured image (106). The reference object points are reference points of the object that are of interest; that is, the reference object points are the points of the object that are desired to be identified within captured images. The points are object points in that they are points of the object within the captured images; the points are reference points in that they are the points that are of interest. The reference object points may be reference points on which a machine learning model can be trained, for instance. The reference object points may be identified using a suitable image processing, pattern recognition, computer vision, or other technique. Such techniques include employing Hough lines and circles, and contouring, as well as image-gradient techniques to then perform feature extraction. Examples of image-gradient techniques include scale invariant feature transform (SIFT), speed up robust feature (SURF), and binary robust independent elementary features (BRIEF) techniques, for instance.

The reference object points identified in a particular performance instance of part 106 are not all the reference points of the object to be identified via the method 100. It may be said that the first time part 106 is performed, first reference object points are identified; the second time part 106 is performed, second reference object points are identified; the third time part 106 is performed, third reference object points are identified; and so on. Therefore, after the first iteration of part 106, there will be additional reference object points of the object to be identified (108) in one or more further iterations.

As such, the method 100 includes modifying the structured light based on the reference object points that have been identified (110). The structured light is modified so as to improve identification of additional reference object points the next time part 106 is performed. The structured light is modified based on the reference object points that have been identified in that how or where the structured light is projected onto the object is modified according to the location, number, and so on, of the reference object points that have already been identified in prior iterations of part 106. Modification of the structured light can include, for instance, changing the shape of the structured light projected onto the object, the position at which the structured light is projected on the object, and so on.

The method 100 is then repeated at part 104, with the capture of an image of the object as is now illuminated by the projected structured light as has been modified. Additional reference object points within this most recently captured image are identified in part 106. The additional reference object points may be able to be better identified (or identified at all) the second time part 106 is performed as compared to the first time part 106 was performed, due to the projected structured light illuminating the object having been modified. That is, illumination of the object by the modified structured light permits or at least improves detectability of the additional reference object points by the image processing, pattern recognition, or computer vision technique being used.

Once all reference object points that are desired to be identified have been identified (108), the method 100 is finished (112). The method 100 thus identifies reference object points within captured images of an object illuminated by projected structured light, over a number of recursive iterations 114 in which the projected structured light is modified. In each recursive iteration 114, the structured light is modified based on the reference object points that have already been identified, to permit or improve detection of reference object points in the next iteration 114. The iterations 114 are recursive in that the structured light is modified in each iteration 114 based on at least the reference object points identified in the immediately prior iteration 114.

Figure 2A:
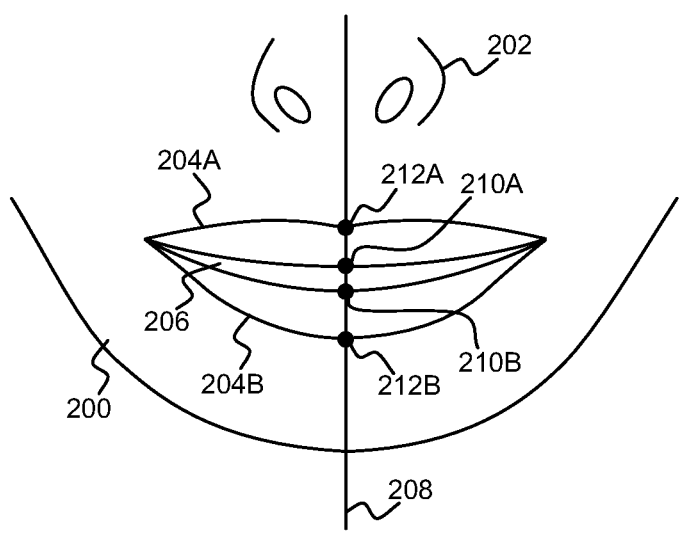
FIGS. 2A and 2B are diagrams depicting example performance of the method of FIG. 1.
Figure 2B:
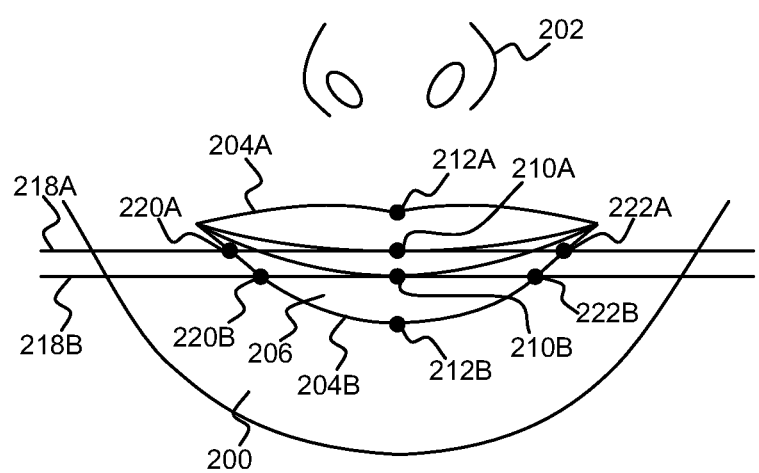

FIGS. 2A and 2B show example performance of the method 100. In FIGS. 2A and 2B, the object onto which structured light is projected is the lower region of a human face 200, including a portion of the nose 202, and also the mouth's upper lip 204A and lower lip 204B, which are collectively referred to as the lips 204. The person whose face 200 is depicted in FIGS. 2A and 2B is slightly smiling. The lips 204 are not touching but rather are slightly open, revealing a gap 206 between the lips 204.

In FIG. 2A, structured light in the form of a single vertical line 208 is projected onto the center of the face 200. The person whose face 200 is depicted may be wearing an HMD in the form of glasses or goggles and that has a light source which can project the structured light. The light source is able to project the single vertical line 208 specifically down the center of the face 200 of the wearer of the HMD due to the HMD being in the form of glasses or goggles, such that the HMD is positioned centrally from left to right on the wearer's face 200.

In FIG. 2A, from the captured image of the face 200 illuminated by the vertical line 208 of projected structured light, reference object points 210A and 210B, collectively referred to as the points 210, and reference object points 212A and 212B, collectively referred to as the points 212, are identified. The reference object points 210 and 212 correspond to visually discernible edges of the lips 204 against the rest of the face 200. The point 210A identifies where the line 208 intersects the lower edge of the upper lip 204A and the point 210B identifies where the line 208 intersects the upper edge of the lower lip 204B. The point 212A identifies where the line 208 intersects the upper edge of the upper lip 204 and the point 212B identifies where the line 208 intersects the lower edge of the lower lip 204B.

The reference object points 210 and 212 can be considered first reference object points that are identified in a first iteration 114 of the method 100 of FIG. 1. The vertical line 208 is the structured light projected in part 102, and the reference object points 210 and 212 are the reference object points identified in part 106 within the image, captured in part 104, of the face 200 as illuminated by the projected vertical line 208. In the example of FIGS. 2A and 2B, there may be additional, second reference object points that are to be identified in a second iteration 114 of the method 100.

In FIG. 2B, therefore, prior to proceeding to the second iteration 114, the structured light projected onto the face 200 is modified in part 110 based on the already identified reference object points 210 and 212. Specifically, the shape of the projected structured light changes from one vertical line 208 in FIG. 2A to two horizontal lines 218A and 218B, collectively referred to as the horizontal lines 218, in FIG. 2B. The structured light projected onto the face 200 is modified based on the points 210 and 212 in the example of FIGS. 2A and 2B in that the where the horizontal lines 218 are projected (i.e., their locations on the face 200) are particularly controlled by the points 210. The line 218A is projected onto the face 200 so that it is tangential to the already identified point 210A corresponding to the lower edge of the upper lip 204A. Similarly, the line 218B is projected onto the face 200 so that it is tangential to the already identified point 210B corresponding to the upper edge of the lower lip 204B.

In FIG. 2B, from the captured image of the face 200 illuminated by the horizontal lines 218, additional reference object points 220A and 220B, collectively referred to as the points 220, and additional reference object points 222A and 22B, collectively referred to as the points 222, are identified. The reference object points 220 and 222, like the points 210 and 212, correspond to visually discernible edges of the lips 204 against the rest of the face 200. The points 220A and 220B identify where the lines 218A and 218B respectively intersect an outermost edge of the lips 204 at the face 200's right side. The points 222A and 222B identify where the lines 218A and 218B respectively intersect an outermost edge of the lips 204 at the face 200's left side. In the example of FIGS. 2A and 2B, the points 220 and 222 each specifically intersect the lower lip 204B, which may be because the face 210 has a smiling expression.

The reference object points 220 and 222 can be considered second reference points that are identified in a second iteration 114 of the method 100 of FIG. 1. The horizontal lines 218 are the projected structured light modified in part 110 of the prior, first iteration 114. The reference object points 220 and 222 are the reference object points identified in the second iteration of part 106, from the image of the face 200 as illuminated by the projected lines 218. In the example of FIGS. 2A and 2B, there may not be any additional (i.e., third) reference object points that are to be identified in a third iteration 114. The method 100 is thus finished after completion of the second iteration 114.

The example of FIGS. 2A and 2B shows how projected structured light in the form of lines can be modified so that the lines are projected over successive recursive iterations in precise locations on an object. Such modification of the projected structured light can thus permit desired reference object points of interest to be identified. If the projected structured light were not modified over recursive iterations, the reference object points of interest may not otherwise be able to be identified as precisely.

Figure 3A:
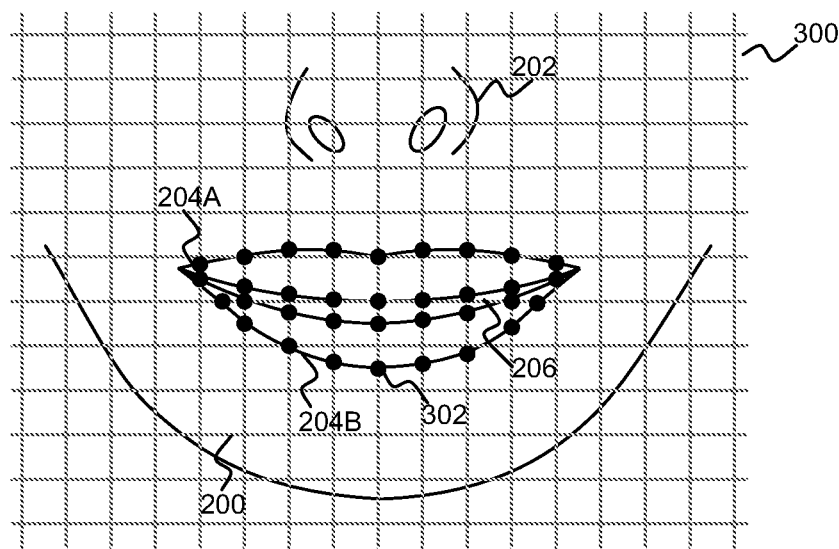
FIGS. 3A and 3B are diagrams depicting another example performance of the method of FIG. 1.
Figure 3B:
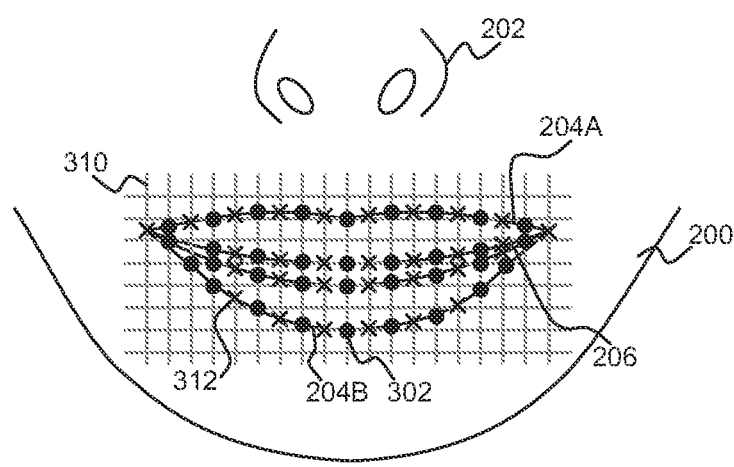

FIGS. 3A and 3B show another example performance of the method 100. In FIGS. 3A and 3B, the object onto which structured light is projected is again the lower region of a human face 200, including a portion of the nose 202, and also the mouth's lips 204. The lips 204 as before are not touching, but rather are slightly open, revealing a gap 206 between the lips 204.

In FIG. 3A, structured light in the form a patterned grid 300 of horizontal and vertical lines is projected onto the lower region of the face 200. The grid 300 is depicted as a two-dimensional (2D) overlay, but in actuality may fit the contours of the face 200. As in FIGS. 2A and 2B, the person whose face 200 is depicted may be wearing an HMD having a light source that can project the structured light.

In FIG. 3A, from the captured image of the face 200 illuminated by the patterned grid 300, reference objection points 302 are identified. The points 302 are depicted as filled-in circles in FIG. 3A. The reference object points 302 each correspond to visually discernible edges of the lips 204 against the rest of the face 200. Each point 302 corresponds to where a horizontal line and/or a vertical line of the grid 300 intersects an edge of the lips 204.

The reference object points 302 are first reference object points that are identified in a first iteration 114 of the method 100 of FIG. 1. The patterned grid 300 is the structured light projected in part 102, and the reference object points 302 are the reference object points identified in part 106 within the image, captured in part 104, of the face 200 as illuminated by the grid 300. In the example of FIGS. 3A and 3B, there may also be additional, second reference object points that are to be identified in a second iteration of the method 100.

In FIG. 3B, then, prior to proceeding to the second iteration 114, the structured light projected onto the face 200 is modified in part 110 based on the already identified object points 302. Specifically, the shape of the projected structured light changes from the patterned grid 300 in FIG. 3A to the patterned grid 310 in FIG. 3B, in which the horizontal and vertical lines are closer together than in the grid 300. The structured light projected onto the face 200 is modified based on the points 302 in the example of FIGS. 3A and 3B in that where the grid 310 is projected on the face 200 is controlled by the points 302. Specifically, the grid 310 is projected from left to right from a set distance beyond the left-most point 302 to a set distance beyond the right-most point 302. Similarly, the grid 310 is projected from top to bottom from a set distance beyond the upper-most point 302 to a set distance beyond the lower-most point 302. Projecting a smaller grid 310 as compared to the grid 300 may permit the lines of the grid 310 to be closer together than in the grid 300.

In FIG. 3B, from the captured image of the face 200 illuminated by the patterned grid 310, additional reference object points 312 are identified. The points 312 are depicted as crosshatches in FIG. 3B. The reference object points 312, like the points 302, correspond to visually discernible edges of the lips 204 against the rest of the face 200. The points 312 identify where the horizontal lines and/or vertical lines of the grid 310 intersect edges of the lips 204.

The reference object points 312 are second reference points that are identified in a second iteration 114 of the method 100 of FIG. 1. The patterned grid 310 is the projected structured light modified in part 110 of the prior, first iteration 114. The reference object points 312 are the reference object points identified in the second iteration of part 104 from the image of the face 200 as illuminated by the projected grid 310. In the example of FIGS. 3A and 3B, there may not be any additional (i.e., third) reference object points that are to be identified in a third iteration. The method 100 is thus finished after completion of the second iteration 114.

The example of FIGS. 3A and 3B shows how projected structured light in the form of a patterned grid can be modified so that the lines are projected over successive recursive iterations in precise locations on an object. Such modification of the projected structured light can therefore permit definition of the facial feature in question—the lips 204 in this case—via more reference object points than if the structured light were not modified over successive iterations. From FIG. 3A to FIG. 3B, the number of lines of the grid that intersect the facial feature of interest increases. As such, the facial feature is defined at a greater resolution than may be possible if the projected structured light were not modified over recursive iterations.

In the examples of FIGS. 2A and 2B and FIGS. 3A and 3B, the projected structured light is in the form of lines, either one or more parallel lines in FIGS. 2A and 2B, or a grid of intersecting lines in FIGS. 3A and 3B. The structured light can be of other shapes or forms as well. As noted above, the structured light may be in the form or shape of circles, ovals, squares, other rectangles, triangles, and other shapes, which may be organized within a grid. Between iterations, the positions and/or shapes of the structured light can be modified to permit identification of desired reference object points over a number of recursive iterations.

Furthermore, in the example of FIGS. 2A and 2B and FIGS. 3A and 3B, the object of which reference object points are identified within images of the object is a human face, particularly the lower facial region and more particularly still the lips of the mouth. However, the object can be a different part of the human face, such as a different facial feature and/or facial region. As one specific example, eyes may be a facial feature of interest, so that eye position can then be tracked. The object may be a different part of a person as well, like the users fingers, arms, wrists, and so on. The object may not be a person in other implementations.

Figure 4:
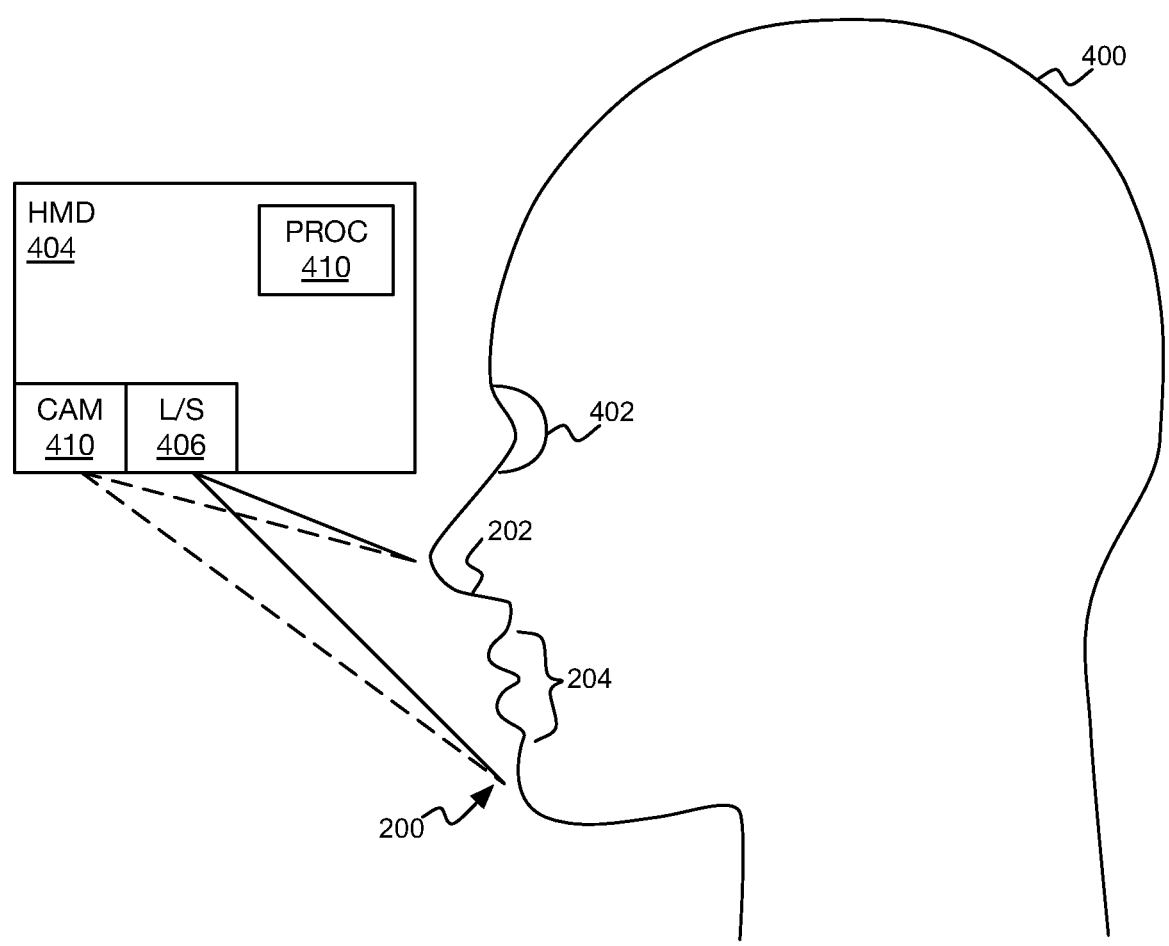
FIG. 4 is a diagram of an example head-mounted display (HMD).

FIG. 4 shows an example HMD 404 that can be worn by a user 400. The HMD 404 may be in the form of goggles or glasses such that the HMD 404 is positioned incident to the user 400's eyes 402. The HMD 404 includes a light source 406, a camera 408, and a processor 410. The HMD 404 can include other components as well, such as one or more displays opposite the eyes 402 of the user 400. The HMD 404 can be employed as an XR technology.

The light source 406 projects structured light onto the lower region of the user 400's face 200, including a portion of the user's nose 202 as well as the user's lips 204, as has been described. The light source 406 may be a microelectromechanical systems (MEMS) light emitter, a digital-light processing (DLP) light source, or another type of light source. The structured light that the light source 406 projects may be in the visible spectrum, or may be in a non-visible spectrum, such as the infrared (IR) or ultraviolet (UV) spectrum.

The camera 408 captures images of the face 200 of the user 400, as illuminated by the structured light that the light source 406 projects. The camera 408 can be a still image or a moving image (i.e., video) capturing device. Examples of the camera 408 include semiconductor image sensors like charge-coupled device (CCD) image sensors and complementary metal-oxide semiconductor (CMOS) image sensors.

The processor 410 may be a general-purpose processor, such as a central processing unit (CPU), or a special-purpose processor, such as an application-specific integrated circuit (ASIC). The processor 410 recursively identifies reference points within images captured by the camera 408 and modifies the structured light projected onto the user 400 (i.e., the wearer of the HMD 404) based on the identified points, by controlling the light source 406. In one implementation, the processor 410 may directly perform processing to identify the reference object points and to determine how to then modify the structured light.

In another implementation, the processor 410 may identify the reference object points indirectly, by transmitting the captured images to a computing system or device to which the HMD 404 is communicatively coupled that then directly performs processing to identify the points. In this implementation, the computing system or device may also determine how to modify the structured light, and transmit corresponding commands or instructions back to the processor 410. The processor 410 in turn controls the light source 406 to modify the structured light, in accordance with the received commands or instructions.

Instances of the HMD 404 may be worn by a variety of different users to collect a rich set of machine learning model training data without having to manually annotate captured images with reference object points (i.e., without interaction by a developer, analyst, or other user). The reference object points are instead programmatically identified, such as in real-time, in a recursive iterative manner as has been described. Once the machine learning model is trained, end or production use of the HMD 404 can thus entail facial feature or expression recognition using reference object points that are identified by the model.

However, the reference object points may be used for purposes other than machine learning model training as well. For example, end or production use of the HMD 404 may achieve facial feature or expression recognition using reference object points that are identified via the techniques that have been described herein. In other words, the techniques described herein may not be used for training a machine learning model that then identifies such reference object points in an end use or production environment, but rather which are themselves used in such environments to identify the points.

Furthermore, the light source 406 and/or the camera 408 may not be a part of the HMD 404. The techniques described herein can thus be performed in relation to the capture of images of an object illuminated by projected structured light in non-HMD contexts. As one example, a light source and a camera may be integrated within the display of a computing device. With the user's face incident to the display, the light source may project structured light onto and capture images of the user's face, from which reference object points are identified. The computing device can modify the structured light based on the identified points and identify additional points from additional images in a recursively iterative manner as has been described.

Figure 5:
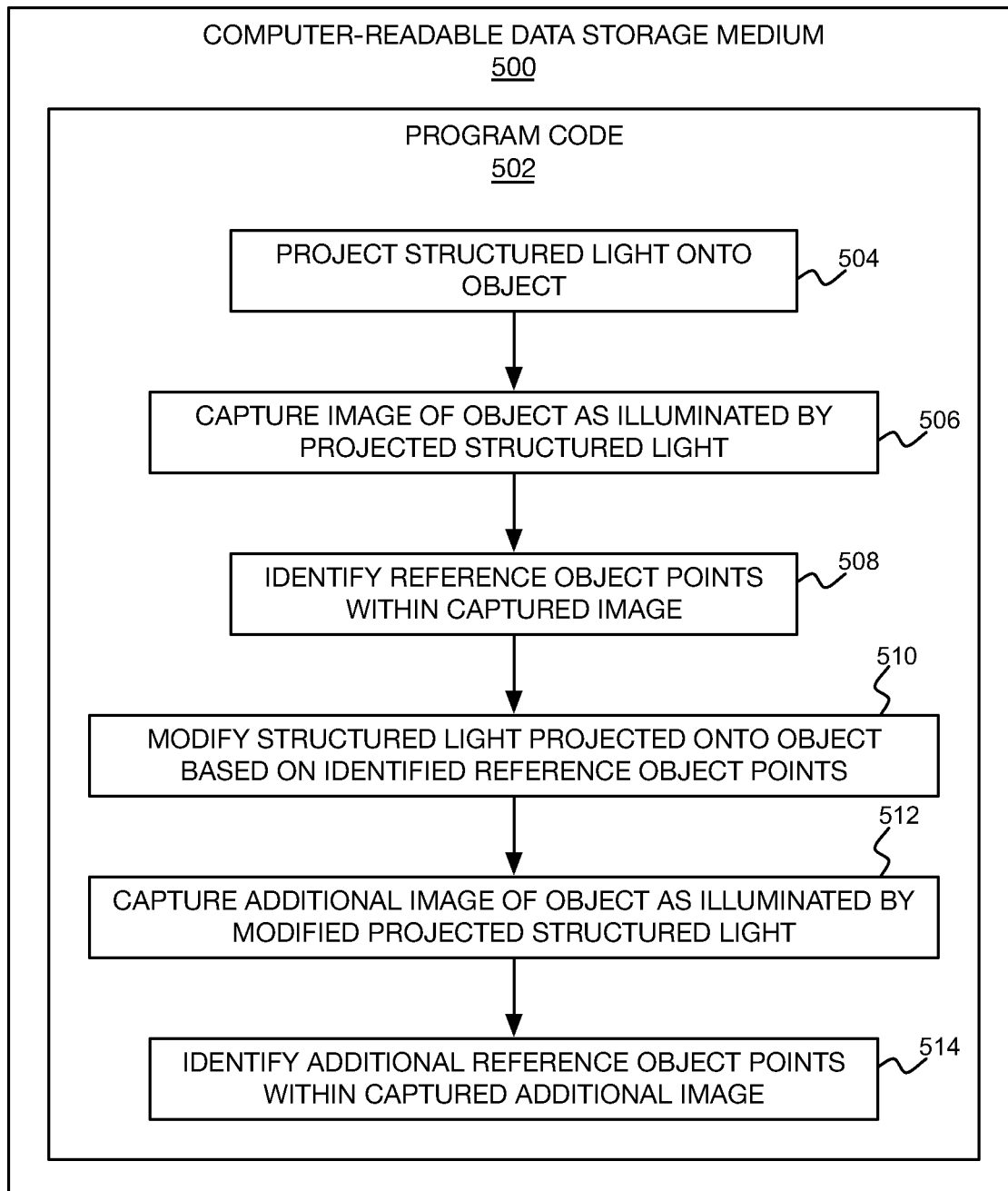
FIG. 5 is a flowchart of an example method.

FIG. 5 shows an example non-transitory computer-readable data storage medium 500. The computer-readable data storage medium 500 stores program code 502. The program code 502 is executable by a processor, such as the processor of an HMD or a computing system or device to which an HMD is communicatively coupled, to perform processing.

The processing includes projecting structured light onto an object (504), and capturing a (first) image of the object as illuminated by the projected structured light (506). The processing includes identifying (first) reference object points within the captured (first) image (508), and modifying the structured light projected onto the object based on the identified (first) reference object points (510). The processing includes capturing an additional (second) image of the object as illuminated by the modified projected structured light (512), and identifying additional (second) reference object points within the captured (second) additional image (514).

One or more additional recursive iterations can be performed to identify further reference object points. For instance, the structured light projected onto the object may be modified a second time, based on the identified second reference object points, and a third image of the object, as illuminated by the projected structured light as modified the second time, captured. Third reference object points can then be identified within the captured third image.

FIG. 6 shows an example method 600. In the method 600, a light source projects structured light onto an object (602), and a camera captures images of the object as illuminated by the projected structured light (604). In the method 600, a computing device, which may include or be an HMD, identifies reference object points within the captured images of the object (606). The computing device then modifies the structured light projected onto the object based on the identified reference object points, as the images are captured and the reference object points are identified (608).

The techniques described herein thus capture images of an object and identify reference object points over recursive iterations in which the structured light illuminating the object is modified. At each recursive iteration, a current image of the object is captured, new reference object points are identified within the captured current image, and the structured light is modified based on the newly identified points. Such projected structured light modification can permit identification of reference object points that otherwise may not be able to be identified.

We claim:

1. A non-transitory computer-readable data storage medium storing program code executable by a processor to perform processing comprising:
   projecting structured light onto an object;
   capturing an image of the object as illuminated by the projected structured light;
   identifying reference object points within the captured image;
   modifying the structured light projected onto the object based on the identified reference object points;
   capturing an additional image of the object as illuminated by the modified projected structured light;
   identifying additional reference object points within the captured additional image;
   wherein the image is a first image, the additional image is a second image, the reference object points are first reference object points, and the additional reference object points are second reference object points, the processing further comprising:
   modifying the structured light projected onto the object a second time, based on the identified second reference object points;
   capturing a third image of the object as illuminated by the projected structured light as modified the second time; and
   identifying third reference object points within the captured third image.

2. The non-transitory computer-readable data storage medium of claim 1, wherein modifying the structured light projected onto the object based on the identified reference object points comprises modifying the structured light projected onto the object to illuminate the object so as to improve identification of the additional reference object points.

3. The non-transitory computer-readable data storage medium of claim 1, wherein modifying the structured light projected onto the object comprises changing a shape of the structured light projected onto the object and a position on which the structured light is projected.

4. The non-transitory computer-readable data storage medium of claim 1, wherein identifying the reference object points, modifying the structured light projected onto the object, and identifying the additional reference object points occur in realtime without user interaction.

5. A method comprising:
   projecting, by a light source, structured light onto an object;
   capturing, by a camera, images of the object as illuminated by the projected structured light;
   identifying, by a computing device, reference object points within the captured images of the object;
   modifying, by the computing device, the structured light projected onto the object based on the identified reference object points as the images are captured and the reference object points are identified within the captured images;
   wherein the images of the object are captured and the reference object points are identified within the captured images over a plurality of recursive iterations of modification of the structured light projected onto the object; and
   wherein at each recursive iteration, a current image of the object is captured, new reference object points are identified within the captured current image of the object, and the structured light projected onto the object is modified based on the identified new reference object points.

6. The method of claim 5, further comprising:
   repeating the method for each of a plurality of objects of a same type to capture training images and identify training reference object points,
   wherein a machine learning model is trained from the captured training images and the identified training reference object points,
   and wherein the machine learning model identifies reference object points within end-use images as the end-use images are captured.

7. The method of claim 6, wherein the objects are human faces and the training reference object points are associated with facial expressions of the human faces.

8. A head-mounted display (HMD) comprising:
   a light source to project structured light onto a wearer of the HMD;
   a camera to capture images of the wearer as illuminated by the projected structured light;
   a processor to recursively identify reference points within the captured images and modify the structured light projected onto the wearer based on the identified reference points; and
   wherein at each of a plurality of recursive iterations, the processor is to identify new reference points within a current image of the wearer that has been captured and is to modify the structured light projected onto the wearer based on the identified new reference points.

9. The HMD of claim 8, wherein the processor is to modify the structured light projected onto the wearer based on the identified reference points to illuminate the wearer so as to improve subsequent identification of additional reference points.

10. The HMD of claim 8, wherein the light source comprises a microelectromechanical (MEMS) light emitter, and the processor is to modify the structured light projected onto the wearer by changing a shape of the structured light that the MEMS light emitter projects onto the wearer and a position at which the MEMS light emitter projects the structured light.

11. The HMD of claim 8, wherein the light source is to project the structured light onto a lower face of the wearer of the HMD, the camera is to capture images of the lower face of the wearer, and the processor is to recursively identify the reference points that are associated with facial expressions of the wearer.

12. A method comprising:
   projecting, by a light source, structured light onto an object;
   capturing, by a camera, images of the object as illuminated by the projected structured light;
   identifying, by a computing device, reference object points within the captured images of the object; and
   modifying, by the computing device, the structured light projected onto the object based on the identified reference object points as the images are captured and the reference object points are identified within the captured images;
   repeating the method for each of a plurality of objects of a same type to capture training images and identify training reference object points,
   wherein a machine learning model is trained from the captured training images and the identified training reference object points, and wherein the machine learning model identifies reference object points within end-use images as the end-use images are captured.

13. The method of claim 12, wherein the objects are human faces and the training reference object points are associated with facial expressions of the human faces.

* * * * *